United States Patent [19]

McComb

[11] 3,847,531
[45] Nov. 12, 1974

[54] DIE ASSEMBLY FOR FOODSTUFF EXTRUDER

[76] Inventor: Kenneth H. McComb, 3285 S. Birch St., Denver, Colo. 80227

[22] Filed: Aug. 29, 1973

[21] Appl. No.: 392,562

[52] U.S. Cl. ............... 425/464, 425/311, 425/380, 425/463
[51] Int. Cl. ............................................. B29f 3/04
[58] Field of Search ...... 264/47, 176, 177; 425/4 C, 425/817 C, 461, 463, 464, 466, 380, 382, 425/311; 241/82.7

[56] References Cited
UNITED STATES PATENTS

| | | | |
|---|---|---|---|
| 3,095,607 | 7/1963 | Cobb, Jr. | 425/463 X |
| 3,190,210 | 6/1965 | McComb et al. | 241/82.7 X |
| 3,304,578 | 2/1967 | Clute | 425/382 |
| 3,431,163 | 3/1969 | Gilbert | 425/380 X |
| 3,458,902 | 8/1969 | Burns | 425/382 |

Primary Examiner—R. Spencer Annear
Assistant Examiner—Mark Rosenbaum
Attorney, Agent, or Firm—Burton, Crandell & Polumbus

[57] ABSTRACT

A die plate organization for use on an extruder for puffed corn products and the like for producing straight rectangular French Fry-style puffed food products. The die organization includes a die plate having an array of orifices each of which is generally X-shaped in cross-section. A sleeve having an array of elongated passages generally square in cross-section is secured to the front of the die plate with the X-shaped orifices corresponding generally to the diagonals of the square cross-section of the passages. Puffed cereal grains and the like are extruded from the die plate through the passages to produce an elongated generally straight square puffed product.

5 Claims, 11 Drawing Figures

DIE ASSEMBLY FOR FOODSTUFF EXTRUDER

FIELD OF THE INVENTION

The present invention relates to food processing equipment and more particularly to an extruder for producing puffed products from particulate ground edible vegetable materials. More specifically, the invention relates to a die plate organization for use with foodstuff extruders, which die plate organization find particular but not necessarily exclusive utility in producing "French Fry" shaped puffed foodstuff products.

BACKGROUND OF THE INVENTION

Extrusion machines for liquifying and extruding ground vegetable foodstuff such as ground edible grains and the like are well known in the art and have been widely utilized for purposes of producing puffed collet products variously known as "corn puff," "corn curls," collets, and the like. Such foodstuff products are generally elongate in nature, cellular in structure, generally circular in cross-section, and of a curled or curved appearance, depending upon the length. One illustrative extrusion machine finding widespread commercial acceptance is shown and described in U.S. Pat. No. 3,190,210 issued June 22, 1965 to Bruce W. Mc-Comb and Kenneth H. McComb for "Extruder Head For Foodstuff." To the extent necessary for a more complete understanding of the present invention, the disclosure of U.S. Pat. No. 3,190.210 is hereby incorporated in this application and by this reference made a part hereof.

Another form of extrusion apparatus is shown in U.S. Pat. No. 2,705,927 issued Apr. 12, 1955 to G. O. Graves and D. F. Rosebrook for "Apparatus For Reducing And Conminuting Cereal Grain." See also the apparatus shown in U.S. Pat. No. 2,842,072 issued July 8, 1958 to G. O. Graves for "Food Processing Machine"; U.S. Pat. No. 2,853,027 issued Sept. 23, 1958 to G. O. Graves for "Food Processing Machine"; U.S. Pat. No. 3,067,671 issued Dec. 11, 1962 to G. O. Graves for "Food Processing Machine."

OBJECTS OF THE INVENTION

It is the principal object of the present invention to produce, from a foodstuff extrusion machine, a generally straight elongated square collet or puffed stick having in general the appearance and configuration of a french fried potato. More specifically, it is an object of the present invention to produce a solidified puffed edible food product from vegetable matter such as cereal grains having a generally straight elongated rectangular configuration.

A related object of the present invention is to provide a die plate organization for a puffed foodstuff extruder capable of producing a puffed product of the foregoing characteristics.

A further object of the present invention is to provide a die plate organization of the foregoing character which is simple in construction, can be adapted to fit on existing commercial puffed food product extrusion equipment, and is rugged, long wearing and effective in use.

Still a further object of the present invention is to provide a die plate organization of the foregoing character which may be readily removed and disassembled for cleaning purposes.

Other objects and advantages of the present invention will become apparent from the following drawings and description of the preferred embodiment of the invention.

SUMMARY OF THE INVENTION

In accordance with the foregoing objects, the present invention contemplates a unique and unobvious die plate organization for use on an extrusion machine for extruding foodstuff to produce generally straight elongated rectangular puffed food sticks. The die plate organization embodying the invention comprises a die plate adapted to be secured on the outlet end of an extrusion apparatus. The die plate is provided with an array of outlet orifices which are generally X-shaped in cross-section. Immediately adjacent the outlet orifices there is provided a corresponding array of elongated channels which are generally square in cross section. The channels are formed by a pair of sleeves, the inner sleeve of which is formed with a plurality of channels or slots, the side walls of which are parallel and perpendicular to a bottom wall. The outer sleeve closes the channels to form a plurality of passages which are substantially square in cross-section.

The passages are aligned with the X-shaped orifices in a manner such that the X-shaped orifices correspond generally to the diagonals of the square cross-section of the passages.

As granulated cereal materials are passed through an extruder in which they are heated and liquified, and extruded out through the X-shaped orifices, the material expands into a generally square cross-section. The expanded or puffed food product is confined in the passages until it solidifies into a straight stick-like puffed food product. The puffed sticks are severed into lengths and the final product has the visual appearance similar to that of french fried potatoes. Appropriate flavorings, seasonings, oils, and the like may be added to the puffed food sticks thus produced.

DESCRIPTION OF THE PREFERRED EMBODIMENT

Figure 1:
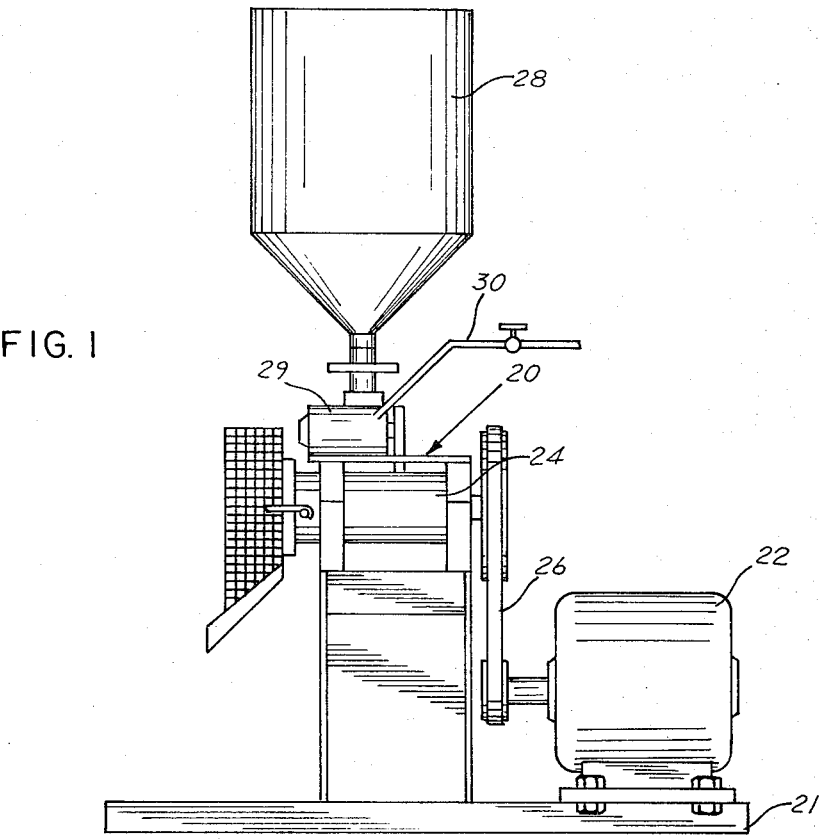
FIG. 1 is a diagrammatic side elevation view of an extrusion apparatus illustrative of the type with which a die plate organization embodying the present invention would be utilized.
Figure 2:
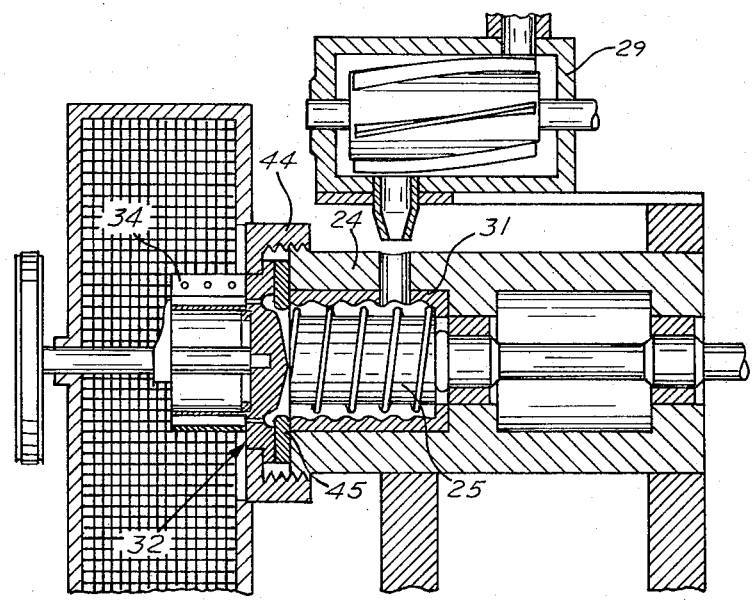
FIG. 2 is an enlarged generally diagrammatic cross-section of the extrusion apparatus shown in FIG. 1 and incorporating a die plate organization embodying the present invention.
Figure 3:
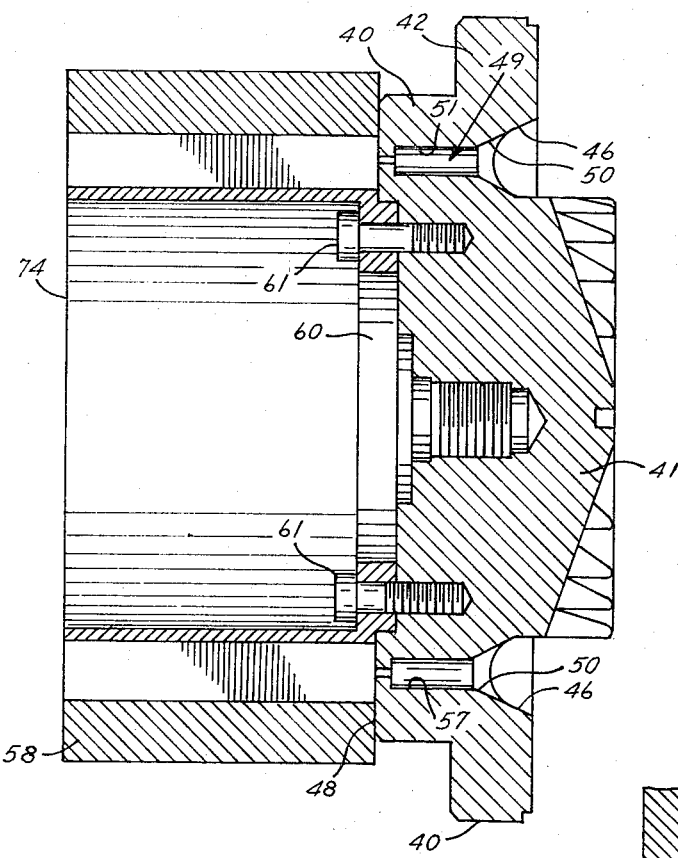
FIG. 3 is a section view taken substantially in the plane of line 3—3 on FIG. 11.
Figure 4:
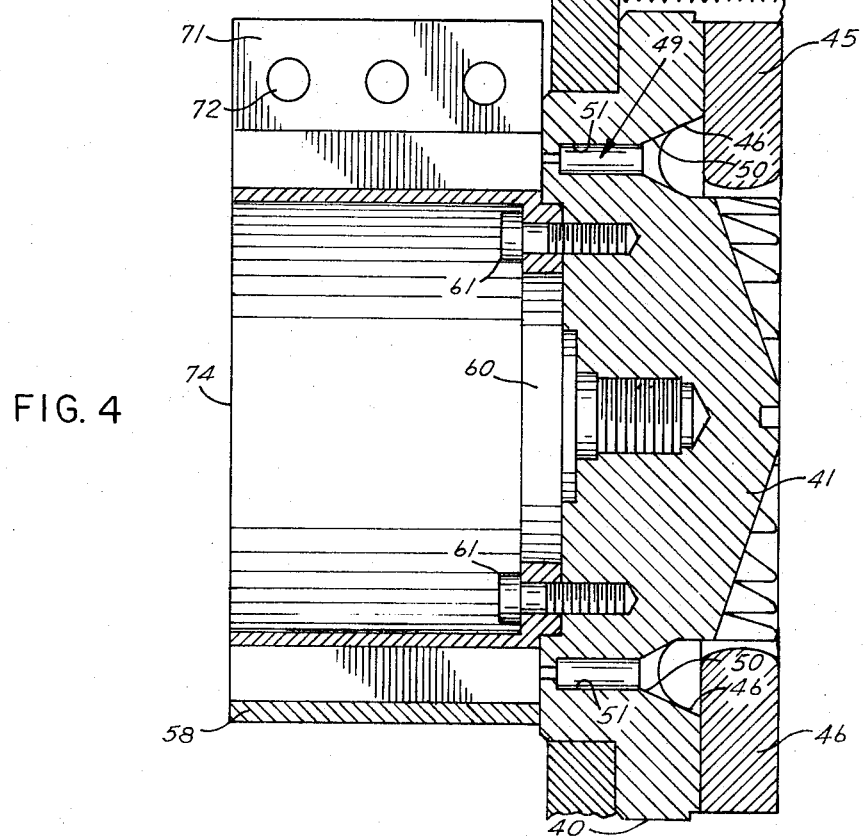
FIG. 4 is a section view taken substantially in the plane of line 4—4 on FIG. 11.

An extrusion machine for producing extruded puffed edible foodstuff such as puffed corn sticks or collets, is shown generally diagrammatically in FIGS. 1 and 2 an comprises and extruder mechanism indicated generally at 20 supported on a base 21 and driven by a motor 22. The extruder 20 generally comprises a cylindrical housing 24 in which is rotatably mounted an auger 25 driven by the motor 22 through an appropriate drive mechanism 26.

Ground particulate vegetable matter to be extruded is fed into the extruder from a hopper 28 through a blender 29 to which moisture may be added through a moisture line 30 in order to maintain the proper consistency and extrusion properties desired. An internally threaded sleeve or insert 31 is positioned within the extruder housing and cooperates with the externally threaded auger 25 to compress the material to be extruded and force it through die openings in a die plate organization indicated generally at 32 closing the discharge end of the extrusion housing 24. The present invention is concerned with the construction and configuration of the die plate organization 32, in order to produce puffed foodstuff products of the desired configuration.

To illustrate the operation of the extrusion apparatus, a cereal grain such as corn is ground to produce discreet particles, but not flour. Other cereal grains or vegetable products may be utilized such as corn, rice, popcorn, soy beans, or various other edible grains, cereals, or other vegetable materials. The ground particulate foodstuff is fed to the hopper 28 from which it passes to the blender 29 where the desired amount of moisture is added. From the blender, the moisturized foodstuff is fed to the auger where it is highly compressed under pressures and friction forces sufficient to build up the heat and pressure necessary to liquify the foodstuff being extruded. The high pressure in the extruder not only liquifies the foodstuff and gelatinizes the starch contained therein, but also converts the water in the mass into steam. As pointed out in U.S. Pat. No. 3,190,210, the heat generated may extend as high as from about 200° to 250° F. and the pressure from about 2,500 pounds per square inch upwards to about 5,000 pounds per square inch. The hot liquified food product is extruded through orifices in the die plate into the atmosphere where the product expands to many times its volume and solidifies into a puffed product. A rotating knife 34 cuts off the extruded puffed mass into the desired lengths. The cut product drops from the apparatus and is conveyed into other operations where various flavors such as cheese, salt and the like may be added to the product.

Figure 5:
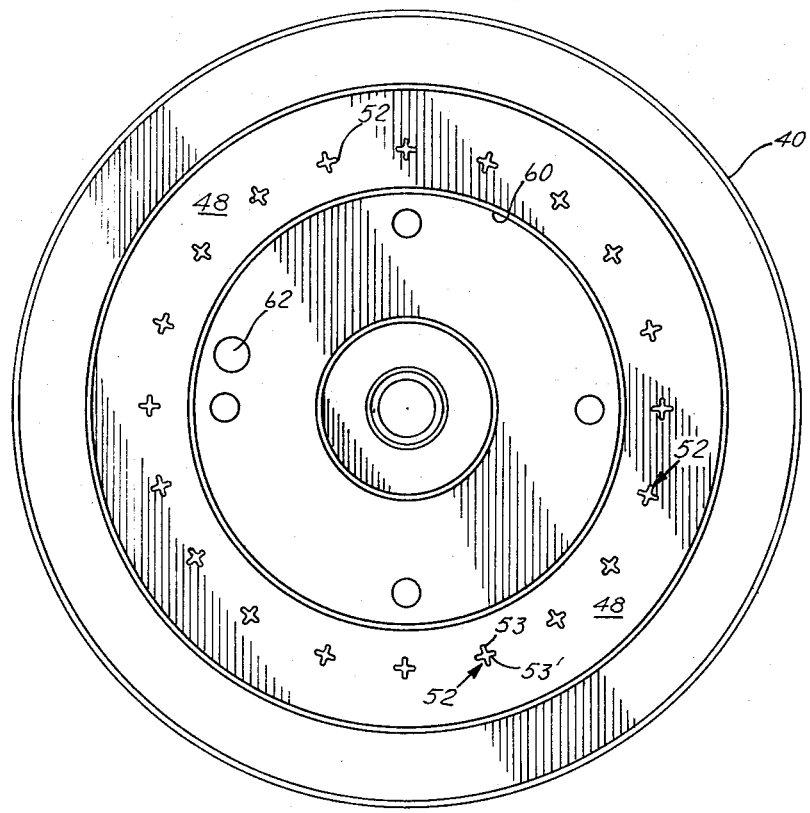
FIG. 5 is a partial front elevation view of the orifice plate portion of the die plate organization shown in FIG. 3.
Figure 6:
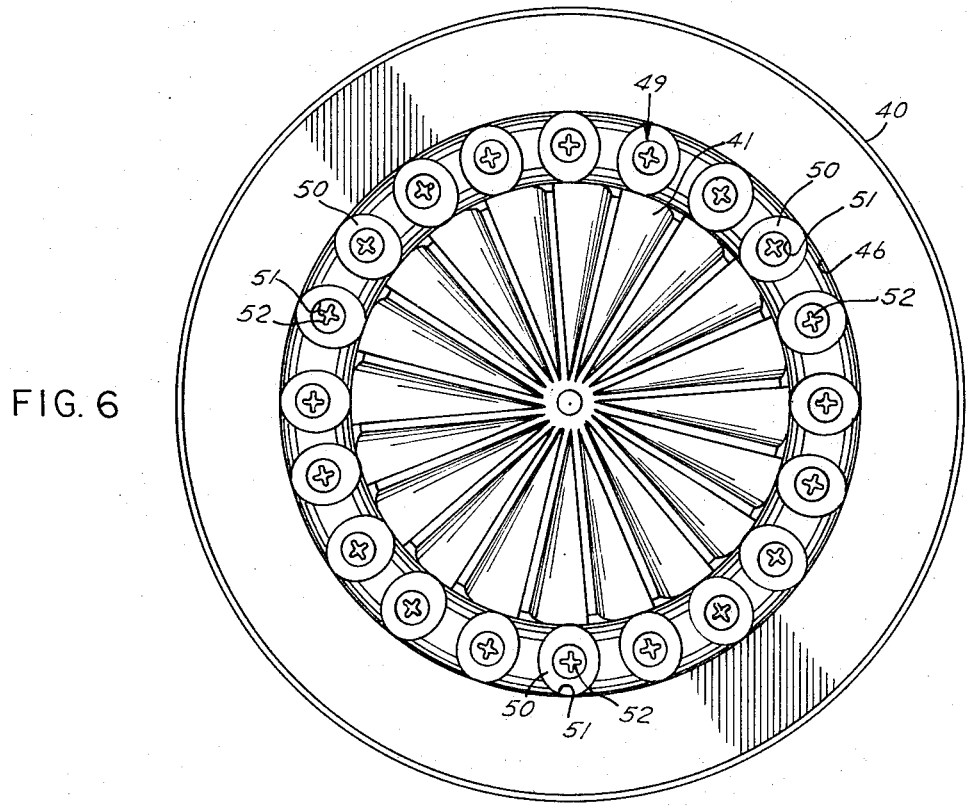
FIG. 6 is a partial rear elevation view of the orifice plate portion of the die plate organization shown in FIG. 3.
Figure 7:
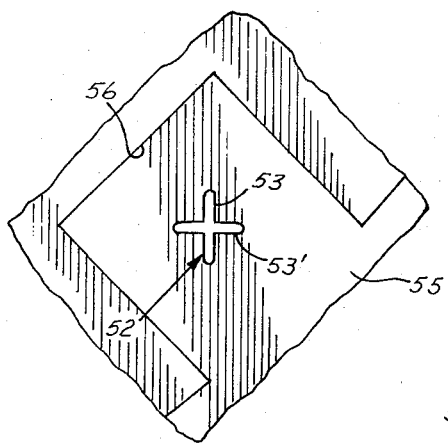
FIG. 7 is an enlarged view of one of the X-shaped orifices in the orifice plate shown in FIG. 5.
Figure 8:
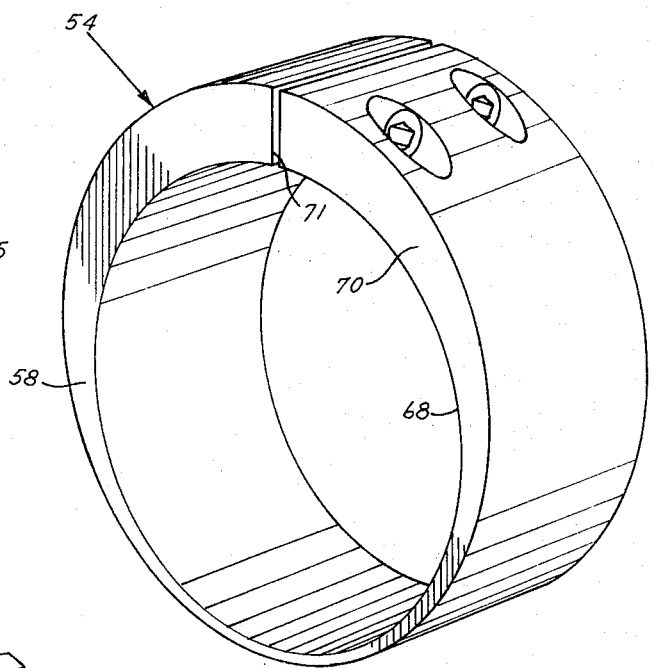
FIG. 8 is a perspective view of the outer collar sleeve member forming a part of the die plate organization shown in FIG. 3.
Figure 9:
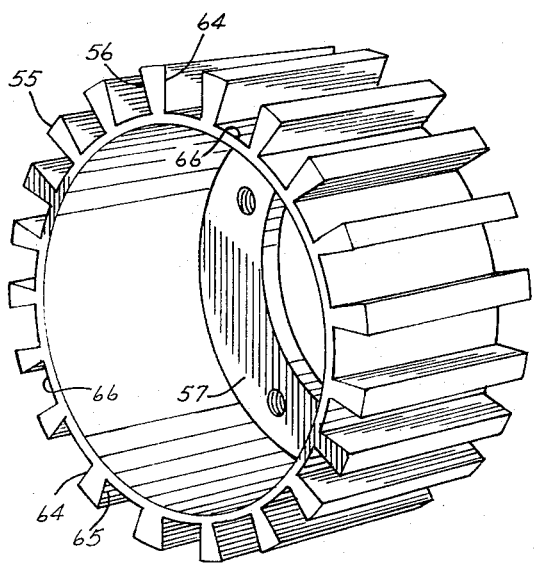
FIG. 9 is a perspective view of the inner grooved sleeve member forming a part of the die organization shown in FIG. 3.

In order to produce a substantially straight elongated product generally square in cross-section, the liquified mass is extruded through the die plate organization shown in FIGS. 3 through 10 inclusive. The die plate organization comprises an orifice or die plate 40 having a rearwardly extending serrated boss 41 on its inner face extending toward the extruder auger. The outer face of the orifice plate 40 is recessed to define a shoulder 42 which is engaged by an annular ring 44 which is threadably engaged with the extruder housing 24. A ring or washer 45 is positioned between the orifice plate and the extruder housing 24 in surrounding relationship with the boss 41 to form an annular internal orifice 46 extending between the auger 25 and an internal groove 48 defined in the inner face of the orifice plate 40 in surrounding relationship with the boss 41. Leading from the inner groove 46 to the outer surface 48 of the orifice plate 40 are a plurality of orifices indicated generally at 49. The orifices 49 are spaced in a circular array and generally taper from a relatively large cup-like opening 50 adjacent the groove 46 through a central intermediate bore 51 to a small outlet orifice 52 opening into the face 48 of the die plate. The configuration of the orifice openings 52 is shown in FIG. 5 and in larger detail in FIG. 7 as being generally X-shaped in cross-section. Referring to FIG. 7, the legs 53 53' of the X-shaped orifice are of substantially uniform width and cross each other at a right angle. The length of the legs is proportioned to the width in the ratio of approximately 4 to 1. With the orifice configuration thus shown, the hot liquified extrudate is initially extruded from the orifice or die plate in the X-shaped configuration shown in FIG. 7. Immediately upon reaching the atmosphere, the pressure is lowered to atmospheric pressure allowing the moisture in the liquified extrudate to expand and puff the foodstuff product being extruded. The expanded foodstuff product, however, is confined within elongated channels generally square in cross-section as it cools and hardens.

In order to form the square channels for receiving the extruded food product from the orifices 52, there is provided a sleeve structure indicated generally at 54 mounted on the outer face 48 of the orifice plate 40. The guide sleeve structure 54 comprises an inner sleeve 55 having an array of rectangular channels 56 in the surface thereof and surrounded by an outer sleeve or collar 58. At one end, the inner grooved sleeve 55 is provided with an interned flange 59 adapted to be seated against and secured to the outer face of the orifice plate 40. To this end, the outer face 48 of the orifice plate 40 is provided with a recess 60 which receives the annular flange 59 on the inner guide sleeve. The guide sleeve 55 is secured to the face plate 40 by bolts 61 which extend through appropriate apertures in the flange 59. The guide pin 62 extends through the flange 59 and into a corresponding aperture drilled in the die plate 40 to insure alignment of the channels 56 with the orifices 52.

Figure 10:
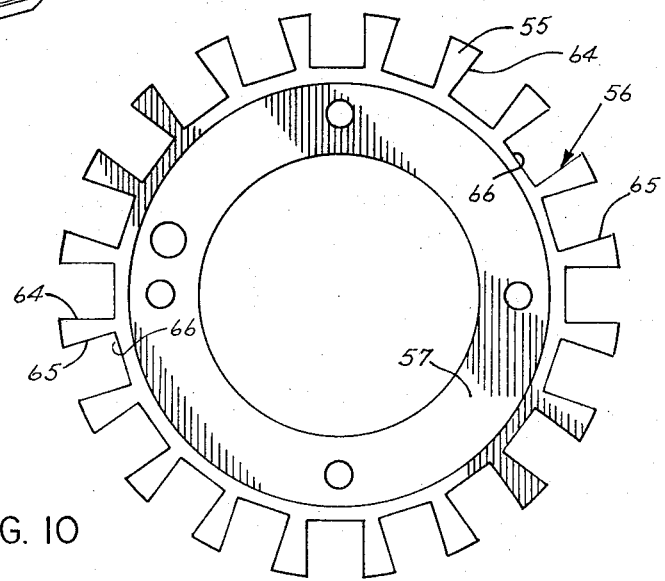
FIG. 10 is a front elevation view of the inner grooved sleeve member shown in FIG. 9.
Figure 11:
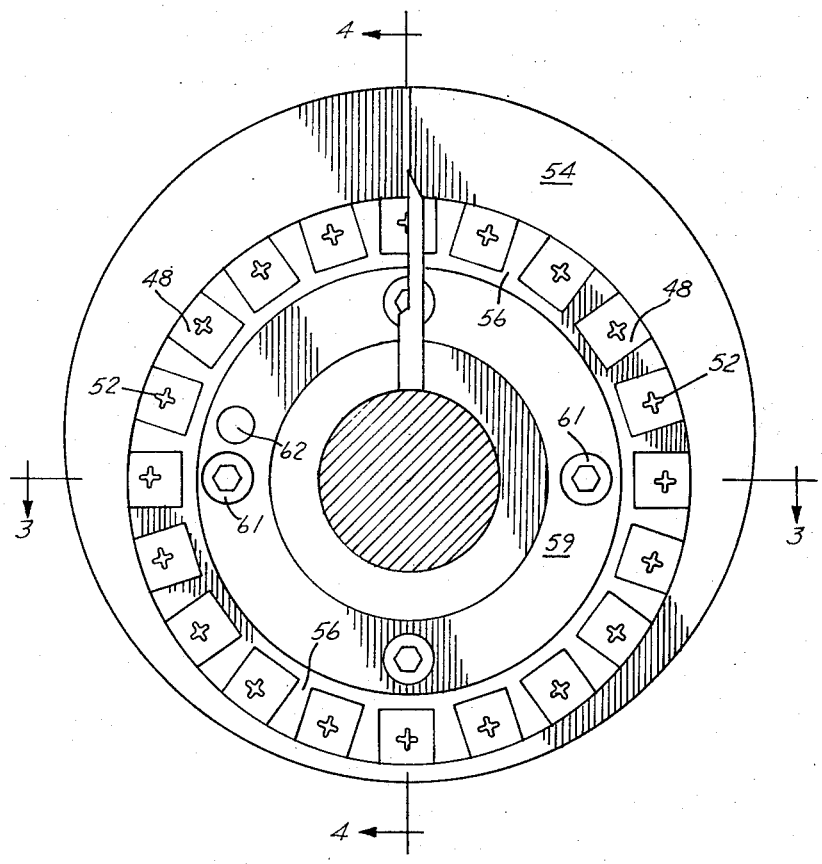
FIG. 11 is a front elevation view of a die plate organization embodying the present invention.

As shown in FIG. 10, each of the channels 56 is generally square in cross-section. To this end, each channel is formed with parallel side walls 64, 65 which are generally parallel to the radius leading from the center of the sleeve through the center of the corresponding channel. The side walls 64, 65 are perpendicular to the inner or bottom wall 66 of each channel. The outer wall of each channel is provided by the inner wall 68 of the outer collar or sleeve 58. While the outer wall 68 of each of the channels 56 is very slightly curved, the channels themselves are substantially square in cross-section. As the extruded food product passes through the generally rectangular channel thus formed, it solidifies into a puffed straight rectangular food product having an appearance substantially that of a french fried potato.

For clamping the collar or outer sleeve around the channelled inner sleeve, the collar 58 is provided with an enlarged portion 70 which is split at 71 to provide in effect a split ring configuration. Clamping bolts 72 are threadably engaged in the enlarged portion 70 of the collar and may be tightened or loosened to clamp the collar on the inner channelled sleeve.

As extruded food product extends outwardly from the channels 56 in the guide sleeve 54, they are severed by a knife rotating against the outer face 74 of the die plate organization in the same manner as described in U.S. Pat. No. 3,190,210. Depending upon the speed of rotation of the knife, shorter or longer extruded products may be obtained. In this manner, puffed foodstuff having a configuration from a cube to an elongated rectangular stick may be readily prpduced.

The X-shaped orifices 52 opening in the outer face 48 of the orifice plate 40 are aligned with respect to the cross-section of the rectangular channels in a manner such that the legs 53, 53' of the orifice openings correspond to the diagonals of the rectangular channels as shown in FIG. 7. Thus, as the hot liquified extrudate expands, it expands and is confined into a generally square cross-sectional shape and the rectangular channels confine the product as it cools and solidifies so that it not only retains its square cross-section but also is prevented from curling. In this manner an attractive puffed cereal or vegetable product is produced which has the unique characteristics of giving the appearance of a french fried potato and thus has wide appeal as a snack product. The puffed product may, of course, be treated with appropriate oils, salt, flavoring materials and the like.

While a certain illustrative embodiment of the present invention has been shown and described in detail, it should be understood that there is no intention to limit the invention to the specific form disclosed. On the contrary, the intention is to cover all modifications, alternative constructions, equivalents and uses falling within the spirit and scope of the invention as expressed in the appended claims.

I claim as my invention:

1. A die plate organization for use with an extrusion machine for liquifying and extruding foodstuffs, comprising, in combination:
   a. a die plate mounted on an extrusion machine and having a circular array of extrusion orifices extending therethrough and opening into the outer face of said die plate, each outer face orifice opening being X-shaped in configuration;
   b. a guide sleeve means secured to the outer face of said die plate, said guide sleeve defining a plurality of substantially square passages corresponding in number to said die plate orifice openings, said square passages each being axially aligned with a corresponding X-shaped die plate orifice, the angular relationship of each said square passage and corresponding orifice being such that the X-shaped die orifice corresponds to the diagonals of the square passage.

2. A die plate organization for use with an extrusion machine for liquifying and extruding vegetable foodstuffs for producing straight elongated puffed sticks having a substantially square cross-section, said die plate organization comprising, in combination:
   a. a die plate mountable on an extrusion machine and having an array of extrusion orifices extending therethrough, said orifices opening into the outer face of said die plate, the outer face opening of each said orifice being of substantially X-shaped configuration;
   b. guide sleeve means secured to the outer face of said die plate and defining an array of axially extending passages corresponding in number to the orifices in said die plate, and with each such passage being axially aligned with a corresponding die plate orifice;
   c. each of said passages being substantially square in cross-section, with each square passage and its corresponding X-shaped orifice being aligned with the orifice legs extending generally diagonally with respect to the square cross-section of the corresponding passage.

3. A die plate organization as defined in claim 2 wherein the legs of said X-shaped orifice openings extend at right angles with respect to each other, and the ratio of the length to the width of each leg being about 4 to 1 and with the legs being of substantially uniform width.

4. A die plate organization as defined in claim 2 wherein the ratio of the cross-sectional area of the square passage to the cross-sectional area of the X-shaped die orifice is about 20 to 1.

5. A die plate organization as defined in claim 2 wherein said guide sleeve comprises an inner sleeve member having a plurality of axially extending slots with the side walls defining each slot being parallel to each other and with said side walls being perpendicular to the bottom wall of the slot, and an outer sleeve member surrounding and enclosing said slots thereby to define a plurality of passages substantially square in cross-section.

* * * * *